Oct. 22, 1946.   W. J. GEIMER ET AL   2,409,621
METHOD OF CLOSING BAG TUBE ENDS
Filed July 27, 1942   4 Sheets-Sheet 1

INVENTORS
WILLIAM J. GEIMER
FRANK R. LINDA
ATTORNEYS

Oct. 22, 1946.  W. J. GEIMER ET AL  2,409,621
METHOD OF CLOSING BAG TUBE ENDS
Filed July 27, 1942  4 Sheets-Sheet 2

INVENTORS
WILLIAM J. GEIMER
FRANK R. LINDA
By Paul, Paul & Moore
ATTORNEYS

Oct. 22, 1946. W. J. GEIMER ET AL 2,409,621
METHOD OF CLOSING BAG TUBE ENDS
Filed July 27, 1942 4 Sheets-Sheet 3

INVENTORS
WILLIAM J. GEIMER
FRANK R. LINDA
By Paul, Paul & Moore
ATTORNEYS

Patented Oct. 22, 1946

2,409,621

UNITED STATES PATENT OFFICE 2,409,621

METHOD OF CLOSING BAG TUBE ENDS

William J. Geimer and Frank R. Linda, Minneapolis, Minn., assignors to Bemis Bro. Bag Co., Minneapolis, Minn., a corporation of Missouri Application July 27, 1942, Serial No. 452,411

6 Claims. (Cl. 93—35)

This invention relates to new and useful improvements in methods of closing bag tube ends, such as in the formation of bag bottoms and in the subsequent closing of the bag tops, and more particularly, but not necessarily, to multi-ply paper bags of the gusseted type, in which opposite walls of the bag body, usually the edge walls, are folded longitudinally of the bag body and are intucked between the side walls in flatwise relation thereto, when the bag is empty.

Paper bags of the general type above referred to, when used for packaging pulverized materials such as flour, sugar, lime, plaster, and various other comminuted materials, particularly the larger sizes, are frequently made with multi-ply walls to provide adequate strength to prevent the bag walls from fracturing or readily becoming damaged as a result of rough handling, which might result in leakage. Bags of the gusseted type are usually made from tubular body blanks, and the bag bottoms may be suitably formed by uniting the bottom-forming wall portions of the blank in accordance with the invention herein disclosed, or by suitably securing together all such wall portions in any desired or well-known manner as, for example, by sewing, to provide, so far as possible, a leakproof connection or bond between the wall portions thus secured together.

To close the open tops of intucked or gusseted bags, as now commonly carried on, the edge walls are intucked between the side walls, and all of the walls are then pressed together into flatwise relation and a strip of tape applied to the flattened end of the bag top and sewed thereto.

Because of the bag walls being made of multi-ply material, it has been customary in the past, when closing the tops of such bags, to sew the bag top walls together by a row of stitches extending across the closed top of the bag. The bag bottom may previously have been similarly formed. Sewing the bag top walls as above stated has not proven entirely satisfactory because the needle or stitch holes made in the walls of the bag provide openings through which portions of the contents of the bag may readily leak or sift. Such openings may also admit moisture, air, and other foreign matter. This is particularly true after the bags have been handled, because strains imposed in the bag walls may elongate the stitch or needle holes, and thereby sufficiently enlarge such holes as to permit considerable leakage from the bag body. The stitch or needle holes also form a line of perforations across the bag ends which materially weaken the bag structure. This inherent weakness has necessitated strengthening the bag body by increasing the number of wall plies, or by using heavier weight paper than would otherwise be necessary, to compensate for the destructive influence of the aforesaid punctured paper closures.

It is therefore highly desirable that some method be provided whereby the end wall portions of single or multi-ply walled bags of the flat or gusseted type, whether of paper or textile, or of a combination of both, may readily and quickly be secured together in leakproof relation to close and seal the bag tube ends, without the use of stitching, and with the assurance that the danger of leakage of the contents of the bag from its sealed ends is positively eliminated along the entire length of the sealed bag ends, including the gusseted portions.

Numerous attempts have heretofore been made to close and sew the open tops of bags of the gusseted type, after said walls have been pressed together into flatwise relation, as shown for example in the patents to R. C. Aery et al., No. 2,109,533, and W. N. Baker et al., No. 2,017,838. In these patents it will be noted that the intucked portions of the edge walls of the bag tops are stitched or stapled together between the side walls of their respective bag tops, whereby the gussets cannot open up or spread, when the bags are being filled. While this has made it convenient to seal the bag tops by sewing, such methods have certain undesirable and objectionable features in that by thus fixedly securing together all of the bag top walls in the gusseted areas, the bag tops cannot be opened to their fullest extent for filling, nor is it possible for the intucked end portions of the edge walls to pull downwardly, or inwardly towards the center of the bag body, out of the plane of the upper edges of the closed bag top walls as a result of internal pressure being applied to the bag walls by the material introduced therein, which is a desirable feature, as will subsequently be described. The same, of course, applies to the intucked end portions of the edge walls at the bottom of the bag.

An object of the present invention, therefore, is to provide a new and novel method of closing the ends of tubular bag blanks of the gusseted type, whereby the wall portions of each end of the blank may readily and quickly be brought into closing and sealing relation and secured together in such relation by conventional machinery, and with the juxtaposed wall portions of the intucked edge walls of the tubular blank firmly united to prevent leakage of the material from the interior of the bag body at the corners of the bag bottom and bag top, when the bag is filled and sealed, and also whereby the major portions of the marginal edge portions of the wall plies at the ends of the body blank are united by a suitable bonding medium, whereby internal strains exerted against the walls of the closed bags, as a result of rough handling of the bags, will be uniformly distributed over all of the wall plies at the bottom and top of each bag, thereby producing a bag structure which is substantially leakproof and materially stronger in construction, and also whereby the closed ends of the filled bags will be substantially symmetrical and neat in appearance.

A further object of the invention is to provide a method of closing the open ends of tubular bag bodies, whereby the juxtaposed walls of the ends of the intucked or gusseted edge walls at the ends of the bag body may be secured together between the side walls of the bag in leakproof relation without the use of staples or stitching, and whereby the inner corners of the intucked edge walls are free to move with respect to the side walls of the bag body, when the bag is filled and closed, thereby minimizing strains imposed in the bag body as a result of the intucked edge walls being forced outwardly into substantially right angular relation to the side walls of the bag body between the top and bottom thereof, by pressure of the contents of the bag thereadjacent.

A further object resides in the application to the upper outer surfaces of the intucked edge walls of the bag body of a suitable bonding material adapted to firmly unite the juxtaposed wall portions of said edge walls at the top and bottom of the bag body, when intucked between the side walls and secured thereto in the operation of closing the bag tube ends, and whereby said intucked edge walls will be retained in leakproof relation and thus prevent leakage at the corners of the bag bottom and top, when the bag is closed and sealed.

A further object is to provide a novel leakproof closure for paper bags of the gusseted type, whereby the flattened bag walls may be secured together in hermetically sealed relation without piercing the bag walls, as when said walls are secured together by sewing or stitching in the usual manner.

A further and more specific object of the invention is to provide a novel method of closing and sealing the ends of tubular body blanks of the gusseted type, in which the walls are made of multi-ply paper, which consists in bonding together the marginal edge portions of the wall plies at each end of the blank substantially around the circumference of the blank ends, or at least around the major portions thereof, and applying a suitable bonding material to the juxtaposed wall portions of the intucked edge walls at the ends of the body blank, and then pressing together all of the bag walls at the bottom end of the blank and adhering a strip of tape over the marginal edges thereof to form the bottom of the bag body, and subsequently applying a similar strip of tape over the pressed together marginal edge portions at the opposite or upper end of the bag body to close and seal its top, the bonding material applied to the juxtaposed wall portions of the intucked edge walls functioning to unite said wall portions to prevent leakage at the corners of the bag top and bottom, and also whereby the intucked corners of the edge walls at the top and bottom of the bag may move relatively to the side walls of the bag body.

A further object is to provide a novel method of closing and sealing the open tops of paper bags of the type in which the bag top walls are initially pressed into flatwise relation to close the bag tops, after which a suitable bonding material is applied to the upper marginal edge portions of the bag top walls or to a surface of a strip of tape which is subsequently folded over the upper flattened edges of the bag top walls and applied thereto, preferably by pressure, whereby said strip of tape will firmly unite together the bag top walls in leakproof relation, and whereby the tops of bags having multi-ply walls may be securely united together in leakproof relation at minimum cost.

A further object is to provide a novel method of closing and sealing the ends of tubular bag blanks without the use of stitches or staples, or other elements which may pierce the walls of the bag structure, which method is applicable to bags having single or multi-ply walls, and whether the bags are of the flat, or gusseted type in which the edge walls are intucked between the side walls of the body blank.

A further object is to provide a bag comprising multi-ply walls having a suitable bonding medium applied to the plies of the bag walls at the ends of the blank by dipping the ends of the blank in a suitable adhesive, or by otherwise applying the adhesive thereto, whereby the adhesive will be applied to the plies of the bag walls substantially around the circumference of the bag ends, and whereby when said ends are subsequently closed and sealed by adhering a suitable sealing strip thereto, strains exerted in the walls of the filled bag body adjacent the top and bottom thereof will be uniformly distributed throughout all of the wall plies, whereby the closed ends of the bag are greatly strengthened.

Other objects of the invention reside in the provision of an improved method of closing flexible walled bags in an efficient and expeditious manner without the use of stitches or staples, and whether the bag walls are composed of one or several plies, or are constructed of paper, or textile fabric, or of a combination of paper and fabric, or of other materials which might be found applicable for use in the construction of bag bodies; in the provision of a multi-ply bag in which a suitable bonding medium is interposed between the plies of the bag walls around the major portion of the circumference of the bag ends, at or near the end edges of the body of the blank to firmly bond or unite said wall plies at these points; in the provision of means for securing the intucked wall portions of the edge walls in sealing relation with respect to the side walls of the bag body, in the operation of forming the bottom and top of the bag; in the provision of flexible edge wall anchor elements adapted to be secured to the outer or inner surfaces of the intucked edge walls at the top and bottom of the bag structure, or to the side walls of the bag, and which anchor elements have tabs projecting beyond the ends of the bag body adapted to be folded over and against the upper marginal edges of the intucked edge walls, or over the side walls, thereby to secure the intucked edge wall portions in sealing relation to the side walls of the bag body; in a bag bottom and closure which is so constructed that a considerable saving in paper bag stock or material may be effected as compared to bag bottoms and closures of the type wherein a row of stitches is employed to secure together the walls of the bags in the formation of the bottoms thereof, and, subsequently, in securing the bag wall tops in closing and sealing relation; and in the provision of a novel method of closing and sealing open tops of flat or intucked flexible paper or textile bags, which may be accomplished on conventional bag-closing machinery and with the assurance that the bag closure, when completed, will be substantially leakproof and will resist rough handling, even though the contents of the bag may be relatively heavy.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figures 1, 2, 28:
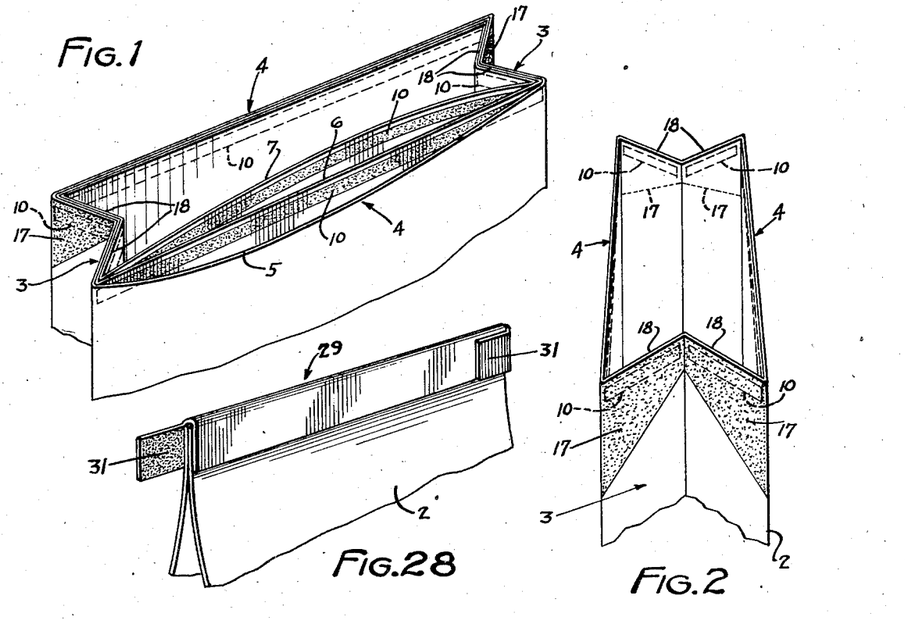
Figure 1 is a perspective view of the open end of a gusset type, multi-ply bag, showing an adhesive applied to the wall plies thereto to secure them together at the ends of the tubular bag blank.
Figure 2 is an edge view of Figure 1, in perspective, showing a bonding material applied to the outer end surfaces of the edge walls of the blank, and also indicating in dotted lines, the areas to which paste is applied for securing the plies together at the edges of the tubular blank.
Figure 28 is a perspective view showing a sealing tape having only one of its opposed walls extending beyond the edges of the bag top to provide tabs adapted to be folded around the tape ends.

In the selected embodiment of the invention herein disclosed, there is illustrated in Figure 1, for purposes of disclosure, one end of a multi-ply bag of the intucked or gusseted type, comprising a body 2 having edge walls 3 and side walls 4. The edge walls 3 are intucked between the side walls 4. In the form illustrated in Figure 1, the walls of the bag body are shown comprising three plies, an outer ply 5, intermediate ply 6, and inner ply 7. It is to be understood, however, that the invention is not limited to three-ply bags, as it applies equally well to bags in which the walls are composed of a single ply, or any number of plies, and whether the bags are of the flat or intucked type, or are constructed of paper, textile fabric, or of a combination of paper and textile, or of any other material which lends itself for use in the manufacture of bags of the character herein disclosed.

When multi-ply paper bags were first introduced on the market some difficulty was experienced in opening the bag tops in the operation of filling the bags, primarily because of the side walls being normally pressed into flatwise relation, when the bags were empty, which made it difficult to quickly separate the two side walls to open the bag top because of the multiplicity of wall plies. This objectionable feature was overcome to some extent by the application of a suitable paste or bonding material between the plies of the bag walls at intervals around the circumference of the bag ends, particularly the top end. This became known to the trade as ply or spot pasting.

To facilitate closing and sealing the open ends of multi-ply bags, it has, for some time, been common practice to apply a strip of tape over the edges of the flattened bag wall ends and stitching or sewing the tape thereto by a row of stitching extending the full length of the tape or across the entire width of the bag end. In the past, this has always been deemed necessary in order that the tape would be secured to all of the plies of the bag walls so as to equally distribute strains imposed in the walls of the closed bag ends among all of the plies thereof. For lack of a better method, this method of sewing a strip of tape to the closed bag ends to seal them has become quite popular with the trade and is still in commercial use.

To secure the tape to the bag end walls by sewing, has certain objectionable features. First, the stitch or needle holes through the walls of the bag end provide small openings through which portions of the contents of the bag body may leak or sift, and foreign matter may also enter the sealed bag through such holes, when the bag is handled. Such leakage may present quite a problem, particularly when the bags are filled with a finely pulverized material as, for example, sugar, and the bags are roughly handled, whereby the stitch holes may elongate or enlarge as a result of strains exerted on the bag walls, whereby considerable leakage may occur. Secondly, the row of stitches across the bag end also greatly weakens the bag structure in that the needle holes provide, in effect, a row of spaced perforations across the ends of each bag body, which materially weakens the bag walls, whereby said walls may easily tear, if the bag is roughly handled. And, thirdly, when closing the bag ends by sewing, provision must be made at the ends of the tubular bag blanks for the stitching, which, in the larger bag sizes, usually requires that approximately five-eighths of an inch of paper stock be added to each end of the tubular blank, or about one and one-fourth inches to the overall length of the blank. Such added material in the blank obviously increases the cost of manufacture, and is therefore objectionable.

In the novel invention herein disclosed, all of the above-mentioned objectionable features have been entirely eliminated, with a resultant saving in material, time and labor, and whereby the ends of the bag body may be closed and sealed without any possible danger of leakage, and with the assurance that the bag closure will withstand severe, rough handling without releasing any of the material from the bag body, or permitting the entrance of foreign matter.

Figures 21, 22, 23, 24, 25, 26:
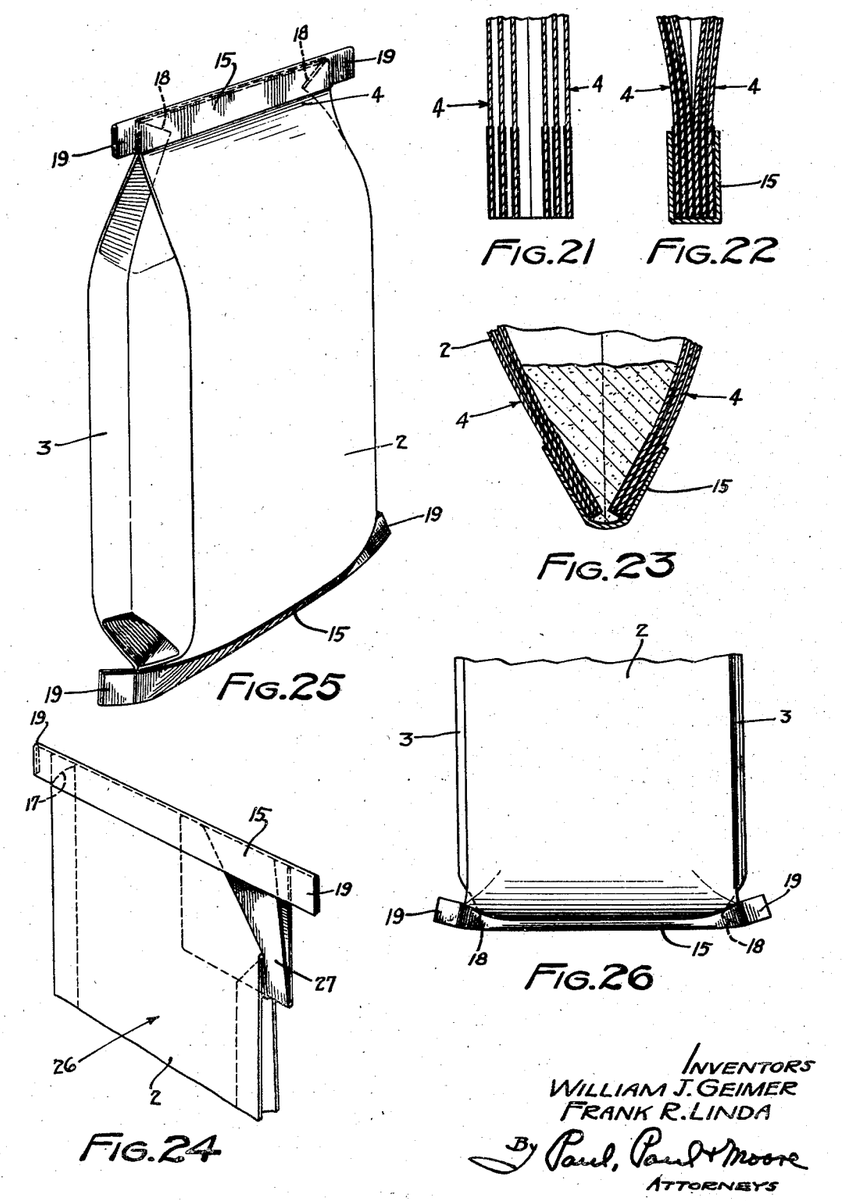
Figure 21 is a detail sectional view showing all of the marginal edge surfaces of the wall plies provided with a suitable paste or bonding medium which may readily be applied thereto by dipping the end of the tubular bag blank into a suitable bonding agent.
Figure 22 is a view showing a bag end of the type shown in Figure 21, closed and sealed by the application of a strip of tape over the end edges of the blank walls.
Figure 23 is a view similar to Figure 22, except that the side walls are shown separated as when a charge is introduced into the bag.
Figure 24 is a perspective view showing the upper portion of a bag of the valve type with the invention applied thereto.
Figure 25 is a perspective view of a filled bag showing the bottom and top closed and sealed in accordance with the present invention.
Figure 26 is a side view of the lower portion of a filled bag, indicating in dotted lines how the lower inner ends of the intucked edge walls are free to pull upwardly into the bag, as a result of internal pressure imposed against the edge walls, when the bag is filled.

One of the important features of the present invention resides in the novel method of applying a strip of tape over the pressed together end walls of a bag top without piercing the bag walls. In other words, we propose to fold a strip of tape over the flattened ends of bags and secure them thereto by a suitable bonding medium or adhesive, as shown, for example, in Figures 4, 25 and 27, whereby the bag ends may be sealed without piercing any of the walls of the bag body. This method of closing and sealing the tubular bag blank ends may be applied to the bottom end of the tubular blank as well as to the top end thereof, as illustrated in Figure 25.

Figure 9:
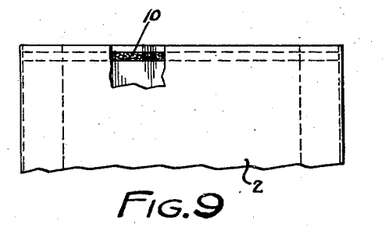
Figure 9 is a view showing a narrow band of adhesive applied between adjacent wall plies around the circumference of the open bag end.
Figure 10:
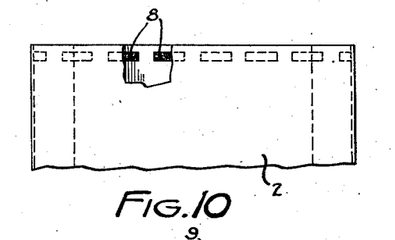
Figure 10 is a view similar to Figure 9, but showing the paste applied at intervals around the area of the bag end.
Figure 11:
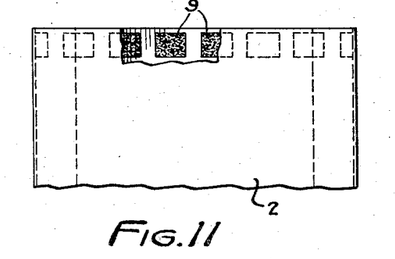
Figure 11 is a view similar to Figure 10, showing the paste applied to relatively larger areas.
Figure 12:
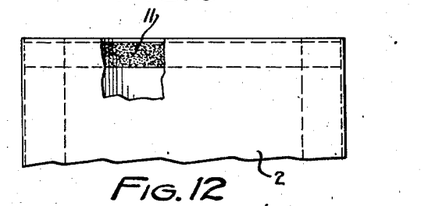
Figure 12 is a detail view similar to Figure 9, except that the paste is applied around the circumference of the bag top in the form of a relatively wider continuous or unbroken band.

In the formation or manufacture of tubular body blanks of the multi-ply intucked type, as shown in Figures 1 and 2, a suitable adhesive 10 may be applied between the plies of the walls of the bag bodies adjacent to the end edges thereof, and substantially around the entire circumference of the open bag ends, as indicated in full and dotted lines in Figure 1. Such bonding together of the bag wall plies is commonly known to the trade as "ply pasting," and may readily be accomplished by machines well known in the art. In some forms of bags it may be deemed advisable to provide an unbroken or continuous band of adhesive to the plies around the circumference of the bag ends, as shown, for example, in Figures 1 and 9, and in other types or forms of bags it may be found more desirable to apply a series of pasted areas 8 around the circumference of the bag ends, as illustrated in Figure 10. It may also be found more desirable in some instances, to increase the width of the band adhesive or pasted areas, as shown at 9 and 11 in Figures 11 and 12, respectively. In some cases it may also be found more desirable to apply still wider paste bands or areas, as shown at 12 in Figure 20, which may be spaced inwardly from the opposed end edges 13 of the tubular bag blanks so that the edges 14 of suitable strips of tape, generally designated by the numeral 15, will be disposed intermediately of the upper and lower edges of their respective paste bands 12.

As hereinbefore stated, the ply pasting above-described is preferably accomplished during the formation of the tubular bag body blanks, whereby when the open ends of the tubular blanks are subsequently to be closed, the wall plies at each bag end will be securely bonded together, as will be clearly understood by reference to Figures 1 and 2. After the tubular bag blanks have been completed, one end of each blank is closed to provide the bottom of the bag, after which the bag may be filled and the top end thereof closed and sealed.

Figures 3, 4:
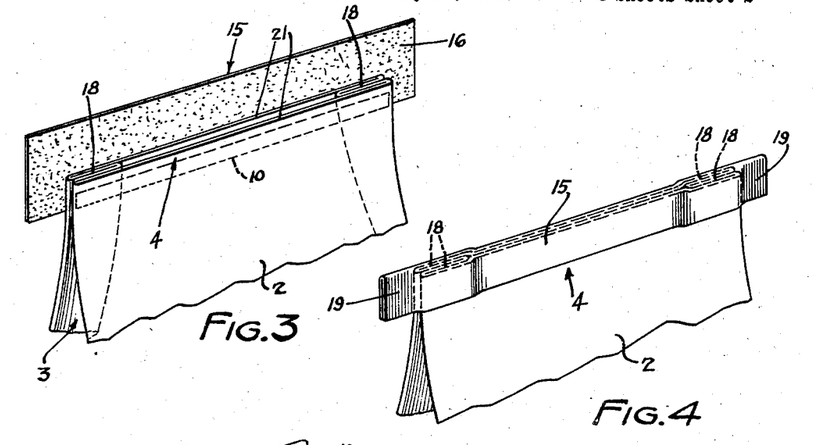
Figure 3 is a perspective view of a filled bag with its top wall portions pressed into flatwise relation with the edge walls intucked between the side walls, and showing a strip of tape in position to be folded over the flattened top walls.
Figure 4 is a view similar to Figure 3, but showing the tape in its sealing position over the flattened bag top walls.

The strip of tape 15, before application to the bag end, is preferably in the form of a flat tape, as shown in Figure 3, to which a suitable adhesive 16 may be applied, in the operation of applying the tape to the bag end. This may be accomplished by conventional machinery, well known in the art.

In the operation of closing and sealing the open end of an intucked bag such as shown in Figures 1 and 2, the edge walls 3 are intucked between the side walls 4 of the bag end and pressed into flatwise relation, as shown in Figure 3, after which the strip of tape 15 is folded over the bag end and subjected to pressure to firmly press the tape and all of the flattened walls into intimate contact with one another to assure a secure bond between the parts. When closing the end of a tubular body blank which is to form the bottom of the bag, the operation of intucking the edge walls is dispensed with, as the edge walls are usually intucked between the side walls of the blank in the formation of the tubular blanks.

Figure 5:
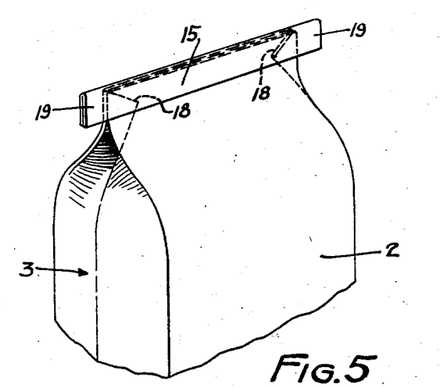
Figure 5 is a perspective view showing the upper portion of a filled bag with its top completely sealed in accordance with the invention, and indicating in dotted lines, the inner upper corners of the edge walls pulled downwardly or towards the center of the bag body, as a result of internal pressure against the edge walls by the contents of the bag.

When the bag is filled, the edge walls are distended, as shown, for example, in Figures 5 and 25, and the upper ends of the edge walls must therefore be intucked between the side walls in the operation of closing and sealing the open bag top, as will readily be understood. When filling a bag of the intucked type, it is highly desirable that the bag top be capable of opening to its fullest extent, to facilitate introducing the material or charge into the bag body. By employing the novel method herein disclosed for closing and sealing bag tops, the open tops of the bags may be opened to their fullest extent, because the upper ends of the intucked edge walls are not in any way secured to the side walls of the bag tops, whereby the bag tops may be readily opened to their fullest extent, as will be understood by reference to Figure 2.

When closing and sealing bag ends of the intucked or gusseted type, as shown in Figures 1 to 5, inclusive, it is necessary, in order to prevent leakage of the contents of the bag at the corners of the bag top, or at the points where the ends of the edge walls are intucked between the side walls, to provide means for securely bonding together the juxtaposed wall portions of the intucked edge walls at the ends of the bag body, whereby the intucked wall portions of the edge walls cannot be separated to permit leakage of the material therebetween.

To prevent leakage of the material through the gusseted portions of the bag closure, a suitable bonding material or adhesive is applied to the extreme end portions of the edge walls 3, as shown at 17 in Figures 1 and 2. These pasted areas on the wall sections 18 of the edge walls are preferably in the form shown in Figure 2, although not necessarily. The adhesive or bonding material 17 may be applied to the edge walls during the operation of closing and sealing the bag tops, and serves to firmly unite together the juxtaposed wall portions 18, when said wall portions are pressed together into flatwise relation between the side walls 4, as shown in Figures 3 and 4. A suitable quick-drying adhesive is preferably used, as is now common in the manufacture of bags, whereby the wall sections 18 will quickly adhere together in flatwise parallel relation, when the end portions of the edge walls 3 are intucked between the side walls 4 of the bag ends, and pressure is applied to the flattened bag end walls. After the bag end walls have thus been pressed into flatwise relation, a strip of tape is applied thereto, as hereinbefore stated, whereby the bag end is hermetically closed and sealed.

Figure 6:
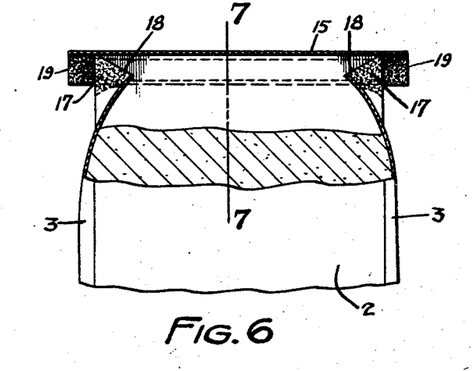
Figure 6 is a side view of Figure 5, partially in section, to more clearly illustrate how the upper intucked wall portions of the edge walls are free to move relative to the upper edges of the side walls of the bag top, and also showing how the projecting ends of the tape are gummed to bond together the juxtaposed wall portions thereof to reinforce the sealed bag end.
Figure 7:
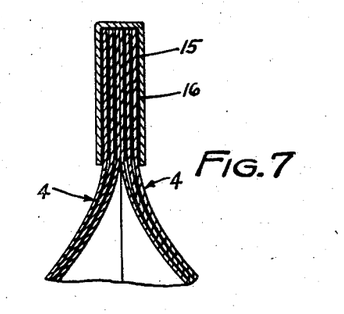
Figure 7 is an enlarged detail sectional view on the line 7—7 of Figure 6, showing how the wall plies of the side walls are bonded together along their upper marginal edges, or in the area covered by the tape.

To further strengthen the sealed bag closure, the end portions 19 of the strip of tape 15 are extended beyond the side edges of the bag end, as clearly illustrated in Figures 4, 5 and 6, and the juxtaposed walls of the projecting tape ends are bonded together as shown. By thus projecting the end portions 19 of the tape beyond the side edges of the bag, and firmly uniting or bonding together the juxtaposed walls thereof, the closed bag end is greatly strengthened, and a closure is provided which will be entirely leakproof, even though the bag may be roughly handled while in transit.

Another feature of the invention resides in the manner in which the juxtaposed wall portions of the intucked side edges are bonded together whereby they are adapted for relative movement with respect to the upper edges 21 of the side walls 4. As best shown in Figures 5 and 6, when the bag top or bag bottom is closed and sealed, the intucked wall portions 18 of the edge walls 3 are free to pull downwardly, or in a direction towards the center of the bag body, as shown in full lines in Figure 6. Such downward pulling of the upper edges of the intucked wall portions 18 permits the edge walls adjacent to the closed ends of the bag body to expand a relatively greater extent than is possible with a sewed closure. Such relatively greater expansion of the intucked edge walls increases the capacity of the bag body and, at the same time, provides a bag body having a neater appearance than bags of the type where the intucked wall portions 18 are stitched or stapled to the side walls of the bag end because of the edges of the filled bag body having greater fullness at the top and bottom thereof, as shown in Figures 5, 6 and 25, and which is not possible when the intucked portions of the edge walls are fixedly secured to the side walls, as disclosed in the patents hereinbefore referred to.

Figure 8:
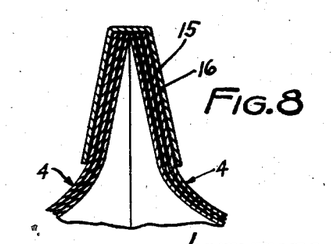
Figure 8 is a view similar to Figure 7, but showing the side walls partially separated.

In addition to the free relative movement of the juxtaposed wall portions at the ends of the edge walls, the side walls of the bag body may be separated or swung apart along the longitudinal center line of the tape, as illustrated, for example, in Figures 8 and 23, whereby the required capacity of the bag body may be maintained with a relatively shorter tubular body blank, than the tape is secured to the bag ends by sewing.

If desired, the adhesive 17 may be applied to the inner surfaces of the wall sections 18 of the edge 3, or to the adjacent corners of the side walls 4, without departing from the scope of the invention.

Figures 13, 14, 15, 16, 17, 18, 19, 20, 27:
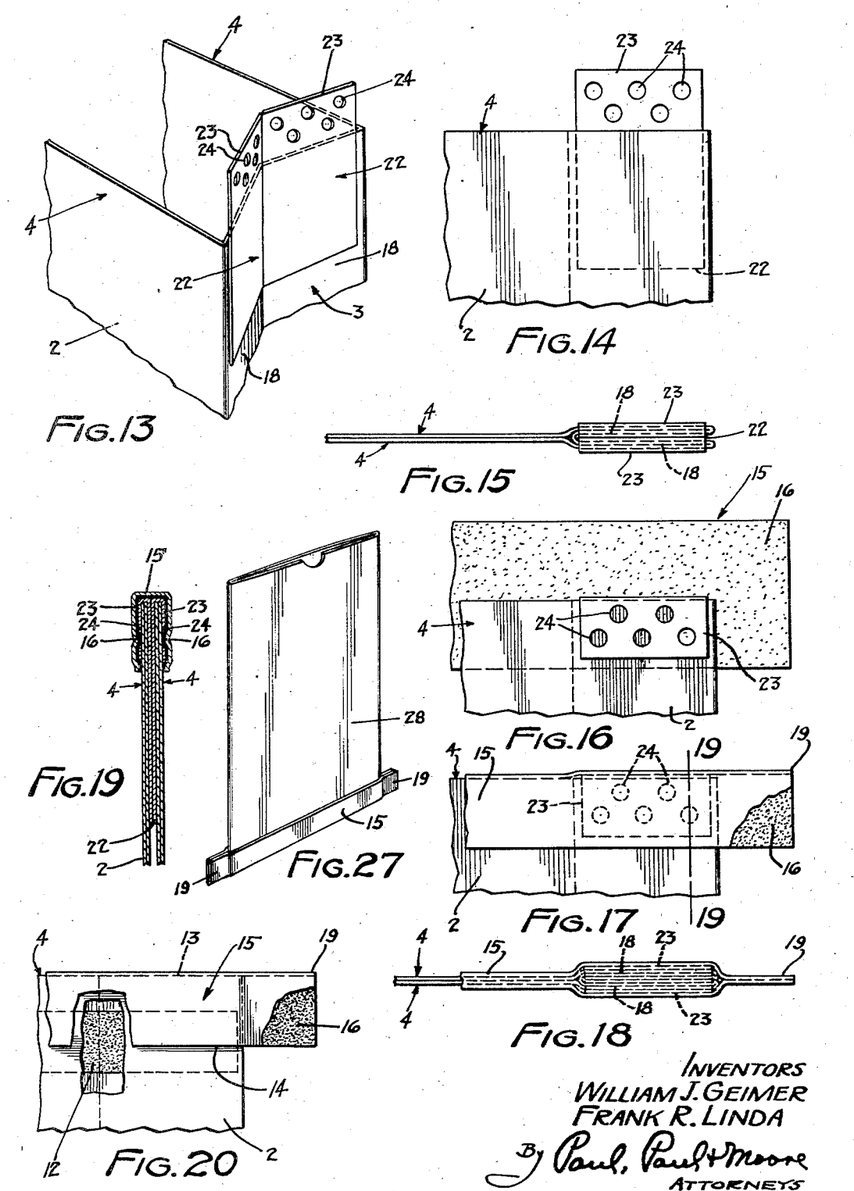
Figure 13 is a detail perspective view showing edge wall anchor elements applied to the upper portions of the edge walls.
Figure 14 is a side view of Figure 13, showing the preferred shape of the anchor elements and also showing the projecting ends of such anchor elements before they are folded over and against the outer surfaces of their perspective side walls.
Figure 15 is a top view of Figure 16, without the tape, showing the projecting ends of the anchor elements folded over and against the outer surfaces of their respective side walls prior to applying the tape over the flattened end of the bag body.
Figure 16 is a view similar to Figure 14, but showing the projecting ends of the anchor elements in sealing engagement with the side walls and also showing a strip of tape positioned to be folded over the flattened bag end.
Figure 17 is a view similar to Fig. 16, but showing the tape in sealing engagement with the bag walls.
Figure 18 is a top view of Figure 17.
Figure 19 is a detail sectional view on the line 19—19 of Figure 17, showing the outer or projecting end portions of the anchor elements concealed under the tape.
Figure 20 is a view showing the marginal edge portions of the bag wall plies bonded together by a relatively wider band or strip of tape so disposed with respect to the end of the bag body that its median plane is substantially coincident with the lower edges of the tape.
Figure 27 is a perspective view showing the invention applied to a bag of the flat type.

In Figures 13 to 19, inclusive, there is shown a construction in which suitable anchor elements, generally designated by the numeral 22, are secured to the outer surfaces of the end portions of the edge walls 3 to retain the intucked portions of the edge walls in proper relation to the side walls, when the bag end is closed. The anchor elements, which may be constructed of paper or any other suitable flexible material, have end portions 23 projecting beyond the end edges of their respective edge walls 18, as clearly illustrated in Figures 13 and 14. The projecting portions 23 are adapted to be folded over the end edges of the edge walls and the juxtaposed wall portions of the side walls, when the edge walls are intucked between the side walls and pressed together into flatwise relation, as shown in Figure 15. The folded over end portions 23 of the anchor elements shown provided with suitable apertures 24 through which the adhesive applied to the top may pass into contact with the side walls 4 of the bag body, as will readily be understood by reference to Figures 16, 17 and 19.

The form of bag closure shown in Figures 13 to 19, inclusive, distinguishes from the form shown in the previous figures in that the anchor elements 22 prevent the intucked end portions of the edge walls from relatively moving with respect to the side walls, as in the form of closure shown in Figures 5 and 6, and without the necessity of piercing the walls of the bag top. If desired, adhesive 17 may be applied to the outer surfaces of the anchor elements 22 to bond together the intucked edge portions of the edge walls 3 in juxtaposed relation, as shown in Figures 2 and 6, when the bag end is closed.

The form of closure illustrated in Figure 20 is similar to that shown in Figures 1 to 6, inclusive, except that a relatively wider band of ply pasting is used, and said band is spaced downwardly whereby its lower edge is spaced below the lower edges 14 of the tape.

In Figure 21 there is shown an enlarged section of a multiply bag blank in which the ply pasting may be effected by dipping the end of the tubular blank into a suitable adhesive. In Figure 22 the bag end shown in Figure 21 has been sealed by the application of a strip of tape 15 thereto. Figure 23 shows a bottom of a bag of the type shown in Figures 21 and 22, with the side walls 4 separated, as when a charge is introduced into the bag. The weight of the charge, when suddenly introduced into the bag, usually separates the innermost plies as shown in Figure 23, but this obviously does not impair the seal of the bag as will be understood.

Figure 24 illustrates the invention embodied in a bag 26 of the valve type, in which a valve sleeve 27 is shown embodied in one corner of the closed top of the bag, as is well known in the art. A strip of tape 15 is applied to the upper flattened bag top walls in the manner shown and described in the previous figures.

Figure 25 shows a complete bag with its bottom and top sealed in accordance with the present invention. In this figure it will be noted that the edge walls 3 may readily be expanded at their upper and lower ends by the introduction of a charge into the bag, whereby the filled bag will assume a very neat appearance. The projecting end portions 19 of the tape, because each has its juxtaposed wall portions firmly bonded together, provide a very secure bag closure.

In Figure 27 the invention is shown applied to a bag body 28 of the flat type in which the bottom of the tubular bag blank is shown closed and sealed by the application of a strip of tape 15 thereto, thereby to complete the formation of the bag bottom. The opposite end or top of the bag may be closed in a similar manner, when the bag has been filled.

In Figure 28 there is shown a bag closure comprising a strip of tape 29 which is folded over the bag top and suitably adhered thereto by a suitable adhesive, in a manner similar to the application of the tape in the previous figures.

The tape shown in Figure 28, however, differs somewhat from the tape shown in Figures 3 to 6, inclusive, in that instead of extending the two side walls of the tape outwardly beyond the edges of the bag end, only one side wall 31 is projected beyond the edge wall at each end of the tape. The projecting tape ends 31 are then folded in a horizontal plan around the edges of the bag end and adhered to the opposite side wall of the tape, as clearly illustrated at the right-hand side of Figure 28. In this type of closure the tape ends do not project beyond the edges of the closed ends of the bags, as in Figure 5.

The intucked wall sections 18 of the edge walls are preferably bonded together, as shown in Figures 5 and 6, whereby the intucked wall portions cannot possibly become separated to permit leakage of the material from the bag body, nor permit the entrance therein of foreign matter. The form of tape shown in Figure 28 may, however, be used in connection with other types of bag closures such as shown, for example, in Figures 17 and 27.

From the foregoing it will be noted that we have developed a novel method of closing the ends of tubular bag blanks, whether of the flat or intucked type, or of single or multi-ply wall structure, without the necessity of piercing any of the walls of the bag ends. The novel closure herein disclosed also effects a saving in paper stock and makes it possible to make the walls of the bag body of relatively lighter weight paper because of the elimination of the row of stitch holes across each end of the bag body. Such economy in material makes it possible to manufacture such bags in quantity production at a considerable saving in cost, as compared to bags of this type as now conventionally made, and which have their ends closed by sewing.

In addition to effecting a considerable saving in the cost of material and manufacture, bags closed and sealed in accordance with the present method provide a neater appearance because of the intucked end portions of the edge walls being free to move with relation to the side walls, as clearly illustrated in Figures 5 and 6. The present invention also makes it possible to close and seal the ends of bag bodies on conventional machinery without requiring additional equipment, and also with the assurance that every bag will be hermetically sealed, and will be capable of withstanding rough handling without danger of becoming leaky.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. The method of closing and sealing the open top of a bag of the intucked type, which consists in securing anchor elements to certain wall portions at the sides of the bag top, which anchor elements have ends projecting above the upper edges of the bag top walls, intucking the edge walls of the bag top between the side walls thereof, pressing all of said walls into flatwise relation, bending the projecting ends of said anchor elements over and against certain of the bag top walls, and folding a strip of tape over the flattened end of the bag top and adhering it to the outer surfaces of opposed walls, thereby to seal the bag top.

2. The method of closing and sealing the open top of a multi-ply bag of the intucked type, which consists in securing anchor elements to certain wall portions at the sides of the bag top and which anchor elements have ends projecting above the upper edges of the bag top walls, bonding together the plies of the bag walls around the circumference of the bag mouth, intucking the edge walls of the bag top between the side walls, pressing all of said walls into flatwise relation, bending the projecting ends of said anchor elements over and against certain of the bag top walls, and folding a strip of tape over the flattened end of the bag top and adhering it to the outer surfaces of opposed walls, thereby to seal the bag top.

3. The method of closing and sealing the open top of a multi-ply bag of the intucked type, which consists in securing anchor elements to the upper ends of the edge walls of the bag top with their upper ends projecting above the upper edges of the bag walls, applying an adhesive to the outer surfaces of the anchor elements, intucking the edge walls of the bag top between the side walls and pressing all of said walls into flatwise relation whereby the adhesive coated surfaces of the anchor elements will bond together the intucked portions of the edge walls, bending the projecting end portions of said anchor elements against their respective side wall portions, and folding a strip of tape over the flattened end of the bag top and adhering it to the outer surfaces of the side walls, thereby to seal the bag top.

4. The method of closing and sealing the open top of a bag of the intucked type, which consists in securing anchor elements to the upper ends of the edge walls of the bag top with their upper ends projecting above the upper edges of the bag walls, intucking the edge walls of the bag top between the side walls and pressing all of said walls into flatwise relation, bending the projecting end portions of said anchor elements against their respective side wall portions, and folding a strip of tape over the flattened end of the bag top and adhering it to the outer surfaces of the side walls, thereby to seal the bag top.

5. The method of closing and sealing the open top of a bag of the intucked type, which consists in securing anchor elements to the upper ends of the edge walls of the bag top with their upper ends projecting above the upper edges of the bag walls, intucking the edge walls of the bag top between the side walls and pressing all of said walls into flatwise relation, downwardly bending the projecting ends of said anchor elements against their respective side wall portions, folding a strip of tape over the flattened end of the bag top and adhering it to the outer surfaces of the side walls, thereby to seal the bag top, and the ends of said tape projecting beyond the side edges of the closed bag top and each tape end having its juxtaposed walls suitably bonded together to further strengthen the sealed bag top.

6. The method of closing and sealing the open top of a flexible walled bag which consists in applying a suitable adhesive to the outer surfaces only of the uppermost portions of the edge walls, intucking said adhesive-coated edge wall portions between the side walls and pressing said wall portions and the upper portions of the side walls into flatwise relation whereby the contiguous adhesive coated faces of each upper intucked edge wall portion are bonded together by said adhesive, and folding a strip of sealing tape over the marginal edge portions of the flattened bag top walls and securing it thereto with its end portions projecting beyond the ends of the bag top, the bonding together of the contiguous faces of each upper intucked edge wall portion sealing said intucked wall portions against leakage and permitting them to relatively move or float between the side walls and thus minimizing strains in the bag top walls.

WILLIAM J. GEIMER.
FRANK R. LINDA.